United States Patent [19]

Kanotz et al.

[11] 4,206,011

[45] Jun. 3, 1980

[54] APPARATUS FOR INSULATING FLEXIBLE CONDUCTORS

[75] Inventors: William M. Kanotz, Pasadena; William R. Lockhart, Baltimore; George F. Piper, Baltimore; William C. Vesperman, Baltimore; Max K. Wilson, Baltimore, all of Md.

[73] Assignee: Western Electric Company, Incorporated, New York, N.Y.

[21] Appl. No.: 856,937

[22] Filed: Dec. 2, 1977

Related U.S. Application Data

[62] Division of Ser. No. 690,802, May 27, 1976, Pat. No. 4,082,585.

[51] Int. Cl.$^2$ .............................................. B29D 23/05
[52] U.S. Cl. ................................. 156/498; 156/244.12; 156/244.13; 156/244.14; 156/500; 425/71; 425/72 R; 425/113; 425/133.1; 425/392; 425/516
[58] Field of Search ................. 156/244.12, 244.13, 156/244.14, 500, 498; 425/71, 72, 97, 516, 113, 378, 133.1, 392, 404; 264/94, 95, 99, 174, 209, 271, 279

[56] References Cited

U.S. PATENT DOCUMENTS

| | | | |
|---|---|---|---|
| 1,933,019 | 10/1933 | Laubi | 264/94 |
| 2,218,459 | 10/1940 | Singer | 156/244.13 |
| 2,291,670 | 8/1942 | Wiley et al. | 264/94 |
| 2,331,195 | 10/1943 | Jannsen | 264/95 |
| 2,471,752 | 5/1949 | Ingmanson | 425/71 |
| 2,656,566 | 10/1953 | Berggren | 264/94 |
| 3,037,068 | 5/1962 | Wessel | 174/69 |
| 3,112,828 | 12/1963 | Zipf | 264/95 |
| 3,151,357 | 10/1964 | Budenbender | 264/94 |
| 3,211,818 | 10/1965 | Beckwith | 264/174 |
| 3,227,786 | 1/1966 | Cohen | 264/95 |
| 3,255,621 | 6/1966 | Ohsol | 156/244.11 |
| 3,346,921 | 10/1967 | Bunish et al. | 425/113 |
| 3,382,535 | 5/1968 | Ferrari | 264/95 |
| 3,400,428 | 9/1968 | Barainsky | 264/94 |
| 3,553,042 | 1/1971 | Cocco | 156/244.12 |
| 3,579,623 | 5/1971 | Thomson et al. | 264/135 |
| 3,651,014 | 3/1972 | Witsiepe | 260/40 R |
| 3,737,490 | 6/1973 | Nicholson | 264/90 |
| 3,763,109 | 10/1973 | Witsiepe | 260/75 R |
| 3,766,146 | 10/1973 | Witsiepe | 260/75 R |
| 3,965,226 | 6/1976 | Werwitzke et al. | 264/93 |

FOREIGN PATENT DOCUMENTS

46-28666 8/1971 Japan ........................................ 425/113

OTHER PUBLICATIONS

Plastic Extrusion Technology & Theory, Schenkel, pp. 306–309, 1968.
Wire & Wire Products, "The Design of Dies for High-Speed Coating", Hammond, pp. 728–728 & 783–785, Jun. 1960.
E. I. Du Pont Bulletin, "Hytrel ® Polyester Elastomer Rheology and Handling", Oct. 13, 1975.
Wire and Wire Products, "High Density Polyethylene Wire Extrusion", Lowe, Charles & Joyce, pp. 862–865, 7/1960.
"Wire Extrusion Techniques", Geon Polyvinyl Materials, pp. 5–6, 1952, Hawk, D. C.
Plastics-Extrusion-Technology, Griff, A. L., pp. 78, 79, 304–309 and 198–201, 1968.
"Cross Head Tooling for Jacket Extrusion", Western Electric Engineer, Moss, J. B., pp. 25–28, Apr. 1967.

Primary Examiner—Caleb Weston
Attorney, Agent, or Firm—E. W. Somers

[57] ABSTRACT

An insulation comprising a polyether polyester thermoplastic copolymer obtained by reacting 1,4 butane diol terephthalate with terephthalate esters of polytetramethylene glycol is coated over an irregularly configured conductor, such as for example, a tinsel conductor, suitable for use in telecommunications cordage by moving the copolymer through an extruder and along a flow path formed between a core tube and wall of a die cavity. The die cavity adjacent to the throat of the die has a frustoconical portion formed with an approach angle of sufficient magnitude to minimize the pressure drop through the extruder to extrude the copolymer at a temperature slightly above the melting point of the copolymer. The copolymer is insulation tubed over the tinsel conductor with a gas at a controlled volume rate of flow being moved through the core tube along with the tinsel conductor to expand the copolymer extrudate as it flows out of the die opening to cool the extrudate and to facilitate advantageously oriented crystalline growth of the copolymer. Subsequently, the insulation is drawn down about the tinsel conductor with a slight spacing therefrom while treating the insulation with water at a predetermined temperature to anneal the insulation in a predetermined manner. A plurality of the insulated tinsel conductors are enclosed in a jacket which comprises a plasticized polyvinyl chloride composition.

10 Claims, 6 Drawing Figures

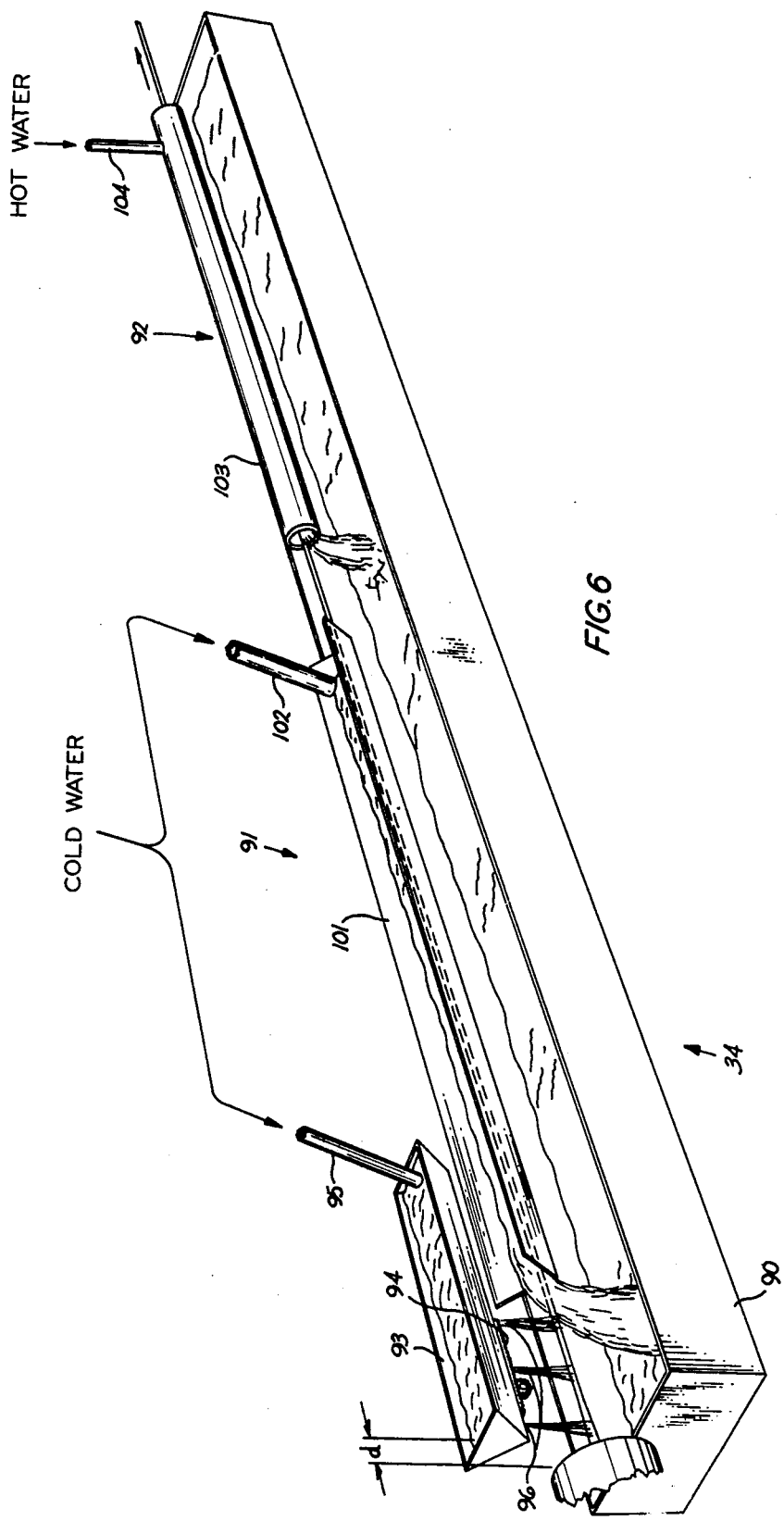

APPARATUS FOR INSULATING FLEXIBLE CONDUCTORS

This is a division of application Ser. No. 690,802 filed May 27, 1976, U.S. Pat. No. 4,082,585.

BACKGROUND OF THE INVENTION

1. Field of the Invention

This invention relates to insulating tinsel conductors and, more particularly, to methods of and apparatus for covering a tinsel conductor, which comprises a core having a plurality of tinsel ribbons wrapped helically thereabout, with a polyether polyester thermoplastic copolymer to produce a substantially concentric insulation.

2. Prior Art

Telephone cords which connect, for example, telephone handsets to the telephone base generally comprise a polymeric core having a plurality of tinsel ribbons wrapped helically thereabout. These cords may have either a linear configuration or may be wound in a helical configuration comprising a plurality of convolutions, the latter being referred to as a retractile or spring cord. Telephone cords are well disclosed in the prior art such as, for example, U.S. Pat. No. 3,037,068 issued May 29, 1962 in the name of H. L. Wessel, and in U.S. Pat. Nos. 2,920,351 and 3,024,497 issued on Jan. 12, 1960 and Mar. 13, 1962 respectively in the names of E. C. Hardesty and D. L. Myers, all incorporated by reference hereinto. In the past, tinsel conductors were covered with a nylon knit and then insulated with an extruded polyvinyl chloride (PVC) composition. A plurality of the individually insulated conductors were jacketed with a plasticized PVC composition. See priorly mentioned U.S. Pat. No. 3,037,068.

In a recently introduced modular telephone cord design, miniature type connectors are connected to each end of a line or spring cord to facilitate attachment to telephone instruments. For example, see U.S. Pat. Nos. 3,699,498 and 3,761,869 issued Oct. 17, 1972 and Sept. 25, 1973 respectively in the names of E. C. Hardesty, C. L. Krumreich, A. E. Mulbarger, Jr. and S. W. Walden and in U.S. Pat. No. 3,860,316 issued Jan. 14, 1975 in the name of E. C. Hardesty, all incorporated by reference hereinto.

With the introduction of modularity, it was necessary to use a different cord construction because of a need for a smaller cross-section. In order to reduce the size of the insulated conductor, the knitted nylon covering over the served tinsel was eliminated. The elimination of the protective nylon knit made it necessary to develop a tough insulation material which could function as a high strength barrier to the cutting action of the tinsel ribbon, as an electrical insulation over the tinsel conductor, and as a primary component to achieve resiliency in a retractile telephone cord. A plasticized nylon insulation was used as a replacement for the knitted nylon covering.

The use of nylon in insulating tinsel conductors has not been altogether satisfactory. Occasionally, portions of one or more of the tinsel ribbons protrude outwardly and cause protruberances in the slow crystallizing nylon insulation. The nylon-insulated conductors must be rewound and passed through a die to eliminate the protruberances. The plasticized nylon also has a tendency to creep under load thereby diminishing somewhat the effectiveness of the strain relief system of the modular plugs disclosed in aforementioned U.S. Pat. Nos. 3,699,498, 3,761,869, and 3,860,316.

In order to overcome these difficulties, cords destined to be used in the modular program and generally having an oval shaped configuration are now manufactured with the insulation over the tinsel conductors being a polyether polyester thermoplastic composition as disclosed and claimed in U.S. Pat. No. 4,090,763 in the names of W. I. Congdon, J. J. Mottine and W. C. Vesperman. That application discloses and claims that the insulation cover comprises a polyether polyester composition obtained by reacting 1, 4 butane diol terephalate with terephalate esters of polytetramythalene glycol. A plasticized polyvinyl chloride jacket is formed over the plurality of the individually insulated tinsel conductors. A material such as that disclosed and claimed in the above-identified Congdon et al application is available commercially from E. I. duPont Company under the trade name HYTREL ®7246 polyester elastomer.

In attempting to manufacture tinsel conductors having an insulation which overcomes the difficulties described hereinbefore, methods and apparatus are provided for applying a reliable continuously concentric insulation and one which avoids the problem of tinsel protrusions into the insulation which necessitate the rewind operation.

Typically, insulation is tubed over tinsel conductors as disclosed, for example, in U.S. Pat. No. 3,553,042 issued on Jan. 5, 1971 in the name of E. R. Cocco and incorporated by reference hereinto. The tubing provides that the insulation material is spaced from the tinsel conductors to provide for relative movement therebetween thus adding to the flexibility and long life of the telephone cord.

In a typical tubing operation, the downstream end of a core tube in an extruder crosshead extends at least to the vicinity of a die opening and in some constructions beyond the opening.

Generally in die designs, the included angle between a converging frustoconical portion of the inner wall of the die adjacent to and converging from the die opening is on an order of magnitude of from 30° to approximately 60°. This included angle is often referred to as the angle of attack or angle of approach.

Information relating to typical angles of attack may be found, for example, on page 117 of *Wire and Cable Coaters' Handbook* as published by the E. I. duPont Company in 1968, and in *Plastics Extrusion Technology and Theory* authorized by Gerhard Schenkel and published by the American Elsevier Publishing Co. in 1966 and by Karl Hanser in Germany in 1963. See also pages 198 to 241 of *Plastics Extrusion Technology*, by A. L. Griff, published by Rinehold Book Corp. and an article entitled "Crosshead Tooling for Jacket Extrusion" by Joe B. Moss on pages 25–28 of the April, 1967 issue of the *Western Electric Engineer*. Also, see duPont brochure entitled HYTREL ® *Polyester Elastomer Rheology and Handling* and, *Wire Extrusion Techniques*, pages 5–6 by D. C. Hank as published by the B. F. Goodrich Chemical Company and U.S. Pat. No. 3,382,535 issued May 14, 1968 in the name of A. G. Ferrari, all incorporated by reference hereinto.

The prior art also shows techniques for controlling the engagement of the tubed plastic extrudate with the core being enclosed. In U.S. Pat. No. 3,211,818 strands are held out of contact with an extruded tubular housing until it becomes sufficiently form-sustaining such as, for example, by cooling, so as not to be forced out of shape or damaged when the strands are allowed to come into contact therewith.

In U.S. Pat. No. 3,227,786 compressed air is introduced into the core tube during the extrusion of the jacket to control shrinkage of the jacket to prevent any compression of the cable core and rearrangement of the strands comprising the core to avoid any increase in capacitance unbalance.

In U.S. Pat. No. 2,291,670 a wire or other filamentous article is coated with a crystalline polymer in oriented form by extruding the crystalline but unoriented polymer at a temperature, preferably above its softening point, after which the wire is drawn through a mandrel and out of a nozzle at a greater linear velocity than that at which the crystalline polymer is being extruded, supercooled and then stretched to provide molecular orientation. Because of the mandrel in the nozzle, the polymer coating emerges therefrom distributed around the wire with an annular space between the wire and the coating.

U.S. Pat. Nos. 2,218,459 and 3,112,828 show extrusion dies for extruding metals in which a beveled area adjacent the die opening has an approach angle on the order of 120° to 140°.

U.S. Pat. No. 3,255,621 shows a die having a lubrication die insert adjacent the die exit port. U.S. Pat. No. 3,267,748 shows an extrusion process for forming a solid cross sectional shape form a billet extruded by a piston. U.S. Pat. No. 3,400,428 shows extruding very viscous thermoplastic materials by using a screw conveyor with a rotatable body being mounted between the conveyor and a die opening.

SUMMARY OF THE INVENTION

A method of covering a tinsel conductor with a polyether polyester thermoplastic copolymer includes advancing a tinsel conductor which includes a core having a plurality of tinsel ribbons wrapped thereabout, extruding an insulation cover comprising a polyether polyester thermoplastic copolymer into enclosing spaced relation with successive sections of the advancing tinsel conductor with the temperature of the extrudate being greater than but as close as possible to the melting point of the copolymer, expanding the extrudate outwardly from the tinsel conductor for a predetermined time to cool the copolymer and to initiate crystalline growth of the copolymer, the expansion of the extrudate being effective to orient the direction of the crystalline growth, then drawing down the insulation cover concentrically about the tinsel conductor while cooling further the insulation cover.

An apparatus for covering a tinsel conductor with a polyether polyester thermoplastic copolymer in accordance with this invention includes facilities for advancing a tinsel conductor which includes a core and a plurality of tinsel ribbons wrapped thereabout, facilities for extruding an insulation cover comprising a polyether polyester thermoplastic copolymer into enclosing spaced relation with successive sections of the advancing tinsel conductor with the temperature of the extrudate being greater than but as close as possible to the melting point of the copolymer, facilities for expanding the extrudate outwardly from the tinsel conductor for a predetermined time to cool the copolymer and to initiate crystalline growth of the copolymer, the expansion of the extrudate being effective to orient the direction of the crystalline growth; and facilities for controlling the advancing means for drawing down the insulation cover concentrically about the tinsel conductor and for cooling the insulation cover to continue the crystalline growth.

BRIEF DESCRIPTION OF THE DRAWINGS

Other objects and features of the present invention will be more readily understood from the following detailed description of specific embodiments thereof when read in conjunction with the accompanying drawings, in which:

FIG. 6 is a perspective view of an apparatus for cooling insulation extruded over the tinsel conductors.

DETAILED DESCRIPTION OF THE INVENTION

Figure 1:
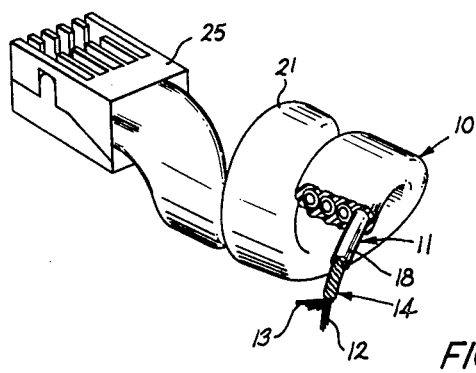
FIG. 1 is a perspective view of a telephone cord having insulated tinsel conductors constructed in accordance with the principles of this invention and showing one end of the cord terminated with a modular plug.

Referring now to the drawings, and particularly FIG. 1 thereof, there is shown a retractile or spring cord, designated generally by the numeral 10. While the invention is described and shown in terms of spring cord, the principles of this invention are applicable generally to the manufacturing or cordage which may be used for either a spring or line cord.

The spring cord 10 is of the type used on telephone instruments which includes a plurality of insulated tinsel conductors, designated generally by the numerals 11—11. Each of the insulated tinsel conductors 11—11 includes a nylon multi-filament center core, designated generally by the numeral 12, about which a plurality of tinsel ribbons 13—13, made typically from a Phosphor-Bronze material are wrapped spirally to form a tinsel conductor, designated generally by the numeral 14 (see FIG. 1).

An insulating cover 18 of a suitable plastic material is extrusion tubed over the tinsel conductor 14 to form one of the insulated tinsel conductors 11—11. Dimensional constraints imposed to devices to which the cord 10 is assembled necessitated a reduction in size of the cord. This necessitated the elimination of the priorly used knitted nylon covering over the individual served tinsel conductors. The elimination of the protective nylon knit produced an irregular rough conductor capable of cutting into priorly used PVC insulation. Moreover, the nylon knit component was a major contributor to the overall resilience of priorly constructed spring cords manufactured as disclosed in previously identified U.S. Pat. Nos. 3,024,497 and 2,920,348 incorporated by reference hereinto, and as disclosed in copending application Ser. No. 641,003 filed Dec. 15, 1975 and commonly assigned.

In summary, conductor insulation material is required to function as a high strength barrier to the cutting action of the served tinsel ribbon conductor 14, an electrical insulation over the tinsel conductor, and the primary component to achieve resiliency in a retractile cord.

The insulated conductor 11 is disclosed and claimed in U.S. Pat. No. 4,090,763, in the names of W. I. Congdon, J. J. Mottine and W. C. Vesperman. The basic insulation polymer which is utilized in the inventive construction is a thermoplastic material, a polyether polyester block copolymer based on short chain ester groups derived from 1, 4 butane diol terephthalate and long chain ester groups based on terephthalate esters of polytetramethylene glycol (hereinafter "PTMEG"). More particularly, the insulation 18 is a composition which includes approximately the following weight percent constituents: 15.7% PTMEG, having a number average molecular weight of about 1000, 32.4% of 1, 4 butane diol and 50.7% of a terephthalic ester-containing compound such as, for example, terephthalic acid. The composition comprising the insulation 18 is produced by reacting two glycols, i.e., the 1, 4 butane diol and the PTMEG, with the terephthalate ester-containing compound to form an ester and ether which results in a polyether polyester copolymer.

The foregoing composition also includes about 1% catalytic residue and is preferably stabilized with about 0.2% of a long chain hindered phenolic antioxidant such as, for example, (N, N'-hexamethylene bis (3, 5-diterbutyl-4-hydroxy-hydrocinnamide). This is a symmetrical diamide composed of 2 moles of 3, 5 dietertiary butyl, 4 hydroxy hydrocinnamic acid and 1 mole of 1, 6 hexamethylene diamine. The long chain hindered phenolic antioxidant system offers migration resistance and is non-discoloring in the presence of ultraviolet light.

An insulation composition suitable for constructing the cordage 10 in accordance with the principles of this invention is available presently from the E. I. duPont de Nemours and Company, Inc. of Wilmington, Delaware under the trade designation HYTREL ® 7246, which is a HYTREL ® 7246 material stabilized with an antioxidant available, for example, from the Ciba-Geigy Company of Ardsley, New York under the trade designation Irganox ® 1098. A color concentrate such as a polyester elastomer available commercially from duPont under the designation HYTREL ® 4056 and having a Durometer hardness as measured on the D scale of 40 combined with Pearl Afflair pigment available from duPont may be added to the HYTREL ® 7246 composition. The first two digits of the numerical designation of the HYTREL ® composition designates the hardness of the material.

Extrusion of the polyester polyether thermoplastic composition is affected by extrusion temperatures and screw design since the insulation composition is characterized by rapid changes in melt viscosity and melt strength with slight variations of polymer temperature. Moreover, the material undergoes a rapid transition between liquid and solid phases. These characteristics could result in non-uniform wall thickness and polymer flow pulsations.

These problems are overcome at least in part, by the addition to the extruder charge of the lower molecular weight lower hardness, and lower melting point polyester in the form of a color concentrate. The lower melting, i.e. 334° F., polyester HYTREL ® material resulted in stabilizing the melting point of the polymer in the extruder transition zone. Unexpectedly, the pigment portion of the color concentrate minimizes variations in melt viscosity of the polymer resulting in a more uniform extrusion process with improved size control of the critical dimensions. The lower hardness HYTREL ® polyester had been used as a pigment and it was expected that a color concentrate would also function as a processing aid.

The insulation 18 is tubed over the tinsel conductor 14 such that an air-induced space between the tinsel conductor 14 and the insulation 18 allows the conductor to move freely within the insulation thereby reducing conductor fatigue. With an average conductor outside diameter of about twenty mils and the size limitation imposed by a modular-terminated cord 10, the tubular insulation 18 has an outside diameter typically on the order of thirty-seven mils. The criticality of the outside diameter coupled with approximately a two mil air space, necessitates a tubular wall thickness of about seven mils. This thin wall construction mandates that the polyether polyester thermoplastic insulation material possess excellent mechanical strength, such as, for example, cut-through resistance, hardness, tensile and compression strength.

The insulation 18 is characterized by crystalline growth within a defined temperature range when cooled below the melt point temperature of the copolymer which is approximately 424° to 428° F. The crystalline growth makes possible horizontal extrusion tubing of the irregular tinsel conductor while developing the necessary strength and rigidity in order to maintain design limitations of the insulated conductor 11.

The insulation 18 has a Durometer hardness of 72 as measured on the D scale and as determined in accordance with specification of the American Society of Testing Materials (ASTM D-2240), and a compression strength of 30,000 psi as determined in accordance with ASTM D-692. In comparison, priorly used plasticized nylon insulation exhibited a hardness of about 50 D. These characteristics provide the individual conductors 11—11 with excellent crush resistance. Superior cut-through resistance which is also provided prevents the sharp tinsel conductor from cutting through the insulation 18 of a cord 10 upon flexing.

The insulation 18 exhibits a modulus of rigidity of approximately 75,000 psi as determined in accordance with ASTM D-790. This characteristic allows the un-knitted insulated conductor 11 to be processed and taken up without entanglement of the insulated conductors.

The high tensile strength of the insulation 18, i.e. 6,000 psi, as determined in accordance with ASTM D-638, in conjunction with its hardness and compression strength to achieve excellent plug-pull resistance, i.e. the force necessary to remove an end device from the cord 10 after termination to the cord.

HYTREL ® material is described as a polyester elastomer material.

The ASTM's Glossary of Definition's ASTM Definitions, second edition 1973, defines an elastomer as a natural or synthetic polymer which at room temperature can be stretched repeatedly to at least twice its original length and which after removal of the tensile load will immediately and forceably return to approximately its original length. Since the polyether polyester thermoplastic possesses a minimum permanent set of approximately 88% it should not be construed as a elastomeric but rather as a thermoplastic material.

The polyether polyester thermoplastic composition suitable for use in constructing conductors in accordance with the principles of this invention is also disclosed generally in U.S. Pat. Nos. 3,651,014 and 3,763,109 both of which are incorporated by reference hereinto. See also U.S. Pat. No. 3,766,146 for a composition of reduced hardness. HYTREL ® plastic materials are also well described in E. I. duPont's brochure titled HYTREL ® Polyester Elastomer and having a designation A-99608. As disclosed in that brochure, HYTREL ® plastics span a range between rubber and rigid plastic materials with Durometer hardness, as measured on the A and D scales, ranging from 92 A to 63 D. Softer members of the series resemble elastomers more than plastics while the converse is true of the harder members of the series. In fact, subsequent trade literature by duPont designated E-00862 discloses properties for a still further harder HYTREL ® plastic as having a Durometer hardness of 72 D. This latter HYTREL ® plastic is designated HYTREL ® 7245.

A plurality of the insulated tinsel conductors 11—11 are arranged in parallel, nontwisted, contiguous relationship with respect to each other and enclosed in a jacket 21 (see FIG. 1) which is comprised, for example, of a plasticized polyvinyl chloride composition. Subsequently, the cord 10 is completed by attaching to one or both ends thereof a modular plug 25.

Figure 2:
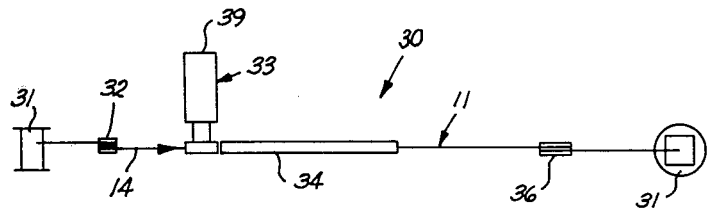
FIG. 2 is a view of an overall manufacturing facility, in schematic form, embodying the principles of this invention for producing insulated tinsel conductors.

Referring now to FIG. 2 of the drawings, there is shown a simplified schematic view of a system designated generally by the numeral 30 for producing tinsel conductors 11—11 covered with the insulation 18. The system 30 includes a supply 31 of a tinsel conductor 14, an accumulator 32, an extruder, designated generally by the numeral 33 for tubing the insulation cover 18 over the tinsel conductor 14, a cooling system 34, a capstan 36 and a takeup 37.

The supply 31, the accumulator 32, the cooling system 34, the capstan 36 and the takeup 37 are all of conventional design and well known in the art. The takeup for example, is a barrel takeup such as that shown for example, in U.S. Pat. No. 3,270,977, which is incorporated by reference hereinto. The cooling system 34 is mounted so that it may be moved closer or further from the extruder 33.

In a normal tubing operation, the insulation 18 is drawn down on the conductor 14 as the conductor is advanced out of the extruder 33 since the conductor is being advanced at a higher rate than that at which the extrudate is issuing from the extruder. The polymer melt emerging from the extruder 33 is referred to as the extrudate. See, for example, page 4 of *Engineering Principles of Plasticating Extrusion* by Z. Tadmor and I. Klein published by Van Nostrand Reinhold Co. and copyright 1970, and pages 53 and 253 of *Processing of Thermoplastic Materials* edited by E. C. Bernhardt and published by Van Nostrand Reinhold Co. copyright 1959, both of which texts are incorporated by reference hereinto.

In prior tubing operations, for a given outside diameter, a specific wall thickness was obtained. It has been found that for insulated conductors 11—11 of the size contemplated for modularity, a normal tubing operation is not adequate to control the dimensions of the insulation 18. Moreover, while a HYTREL ® plastic material to vary in consistency thereby necessitating a greater degree of control.

In a tubing operation such as that described hereinbefore, problems also occur because the insulation 18 is to be drawn on the advancing tinsel conductor 14 which is irregularly configured. The tinsel conductor 14, occasionally has thin slivers of tinsel material, metal burrs or lumps protruding outwardly from the periphery thereof. In the past these slivers or burrs intrude into the insulation 18 being drawn down thereonto causing protuberances in the outside surface of the insulated conductors 11—11. It was then necessary to rewind the insulated conductor 11 in order to locate and correct these protuberances.

It has been found that by controlling the draw down of the insulation 18 about the conductor 14, the outside diameter of the insulated conductor 11 as well as the wall thickness of the insulation cover can be controlled and the occurrence of irregularities in the surface of the insulated conductor can be minimized. The control is to be obtained by maintaining the extrudate spaced out from the tinsel conductor 14 for at least a predetermined time. This is made possible by the relatively high melt viscosity and melt strength of HYTREL ® type plastic. Melt strength is intended to refer to a property of plastics which is analogous to a measure of ductility in metals.

The aforementioned dimension and strength control result from the polyether polyester copolymer which comprises the insulation 18 being a crystalline material in which crystalline growth occurs in the range of about 140° F. to about 420° F., and maximum growth in a range of about 180° F. to 200° F. In order to resist disfiguration of the outward configuration of the insulated conductor 11 by irregularities in the tinsel conductor 14, it would be most advantageous to provide for substantial crystalline growth and development of sufficient melt strength in the copolymer prior to the copolymer being caused to assume its ultimate position relative to the tinsel conductor. This may be accomplished by extruding the copolymer at a temperature slightly above but as close as possible to its melting point, i.e. 424° F. to 428° F. and by spacing the extrudate from the tinsel conductor 14 for a predetermined time sufficient to obtain a desired crystal growth and developement of melt strength. Typically the temperature of the melt at the extruder die opening is about 435° F. which although just a few degrees more than in the extruder barrel increases the melt viscosity because of the steepness of the curve of viscosity versus temperature of the composition which comprises the insulation 18.

Figure 3:
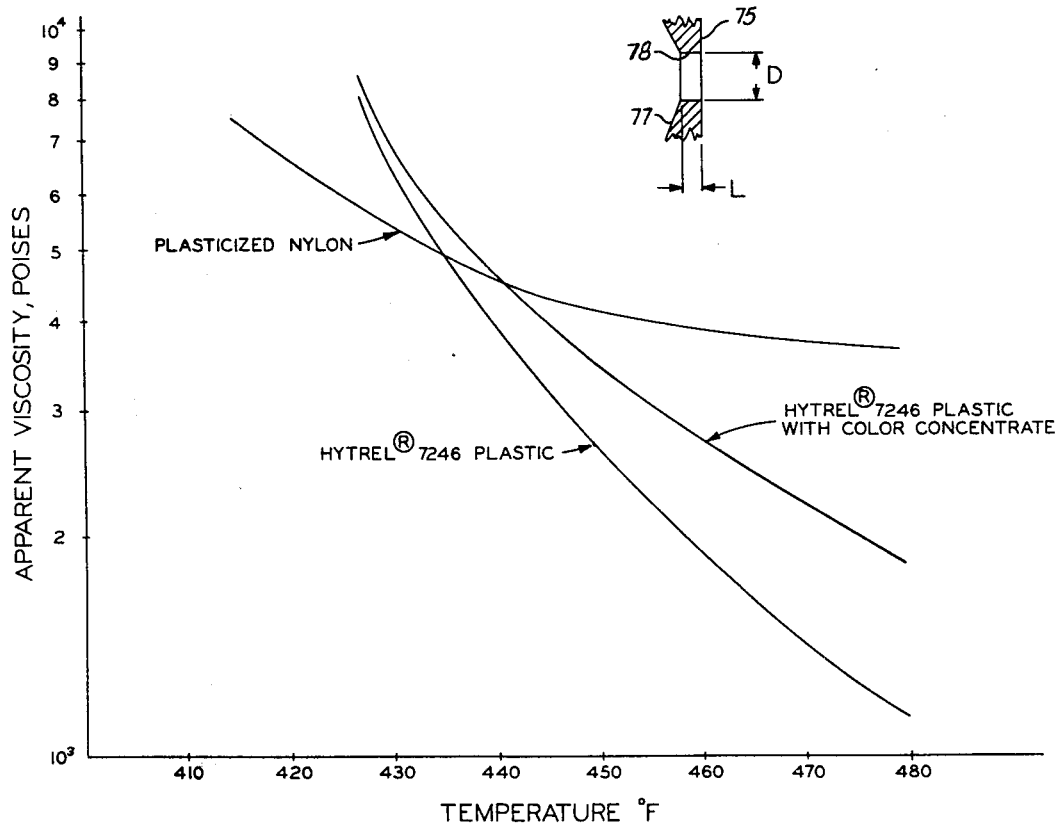
FIG. 3 is a graph showing curves of apparent viscosity and temperature for several compositions used as insulation for tinsel conductors.

The E. I. duPont Company has published a number of brochures which describe the properties of the HYTREL ® polyester elastomer materials. For example, one of the brochures published by duPont is entitled *Rheology and Handling*. This particular brochure is important in discussing melt viscosity of the insulation material. Melt viscosity goes to the characteristic of how viscous the material is at a specified temperature. A low viscosity material flows very freely within the extruder 33. The melt viscosity for HYTREL ® changes rapidly with time and temperature. For example, as shown in FIG. 3 the apparent viscosity in poises for HYTREL ® 7246 plastic drops from approximately $7 \times 10^4$ at a temperature of 430° F. to approximately $1 \times 10^4$ poises at a temperature of approximately 470° F. By comparison, plasticized nylon has an apparent viscosity of approximately $7 \times 10^4$ poises at approximately 420° F. and drops to about $3.75 \times 10^4$ poises at a temperature of 480° F. Morover, the vinyl melt viscosity does not change as drastically with respect to temperature. Nylon and HYTREL ® become watery, HYTREL ® much more so than nylon.

Further, it is important to obtain a uniform melt because the HYTREL ® material is a crystalline material, with a crystallization rate about one and one half times that of nylon. If the melt is uniform, then the crystallization rate becomes more uniform.

Since the temperature of the insulation composition is dropped adjacent the die opening in order to maximize the melt strength of the extrudate, it would appear that the flow path in the extruder crosshead should be as streamlined as possible. If the flow path in the extruder 33 were not streamlined, it would seem to follow that the thermoplastic material would remain for a longer period of time within the extruder crosshead and would therefore possibly degrade. See page 254 of the hereinbefore mentioned *Processing of Thermoplastic Materials*, "High Density Polyethylene Wire Extrusion" by C. Lowe and W. H. Joyce on pages 862–865 of the July, 1960 issue of *Wire and Wire Products*, and "The Design of Dies for High-Speed Wire Coating" by L. R. Hammond on pages 725–728 and 783–785 of the June, 1960 issue of *Wire and Wire Products*. If degradation occurs, it would appear that the thermoplastic material would lose melt strength which is required in order to form the next step of the process wherein the insulation 18 is spaced substantially from the tinsel conductor 14 while the insulation crystallizes. If the melt strength decreases, then it would seem that air pockets would occur undesirably in the insulation 18.

Figure 4:
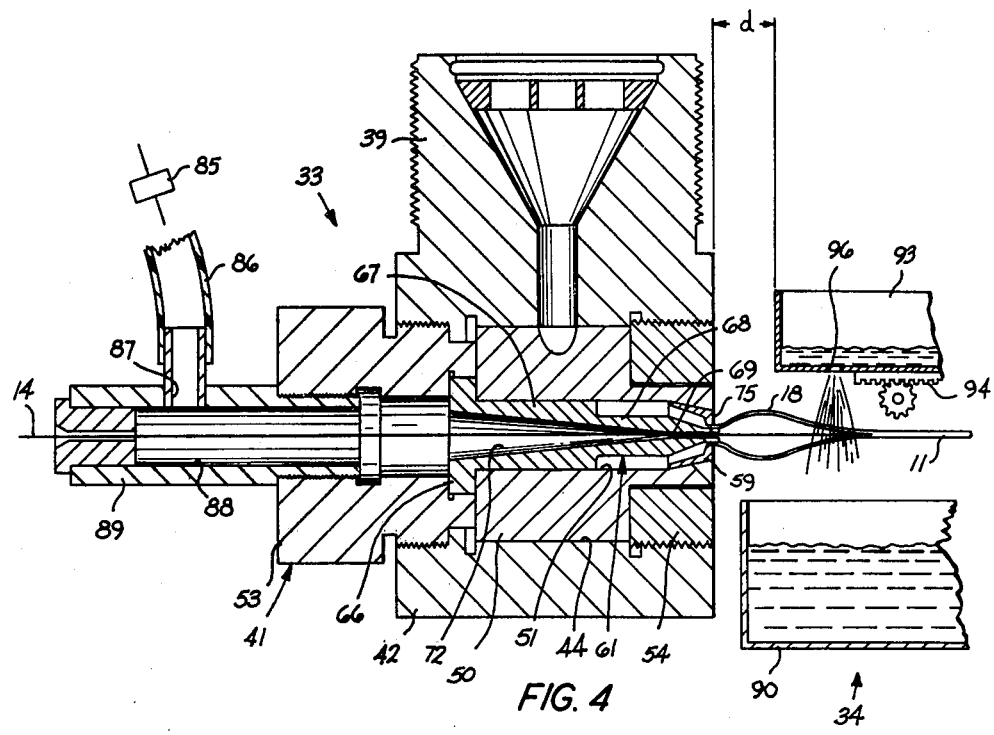
FIG. 4 is an enlarged view of a portion of the apparatus shown in FIG. 2 and showing portions of an extruder crosshead and of cooling facilities.

Referring now to FIGS. 2 and 4 of the drawings, the extruder 33 has a barrel 39. The extruder 33 also includes of the type for example shown in U.S. Pat. No. 3,579,608, incorporated by reference hereinto, which is rotated by suitable source of power (not shown) for the purpose of forcing to force the insulating material 18 through an extruder crosshead, designated generally by the numeral 41. The crosshead 41 comprises a body member 42 provided with an opening forming a continuation of the bore in the barrel and which communicates with a cylindrical bore 44 formed in the body member 42 transversely with respect to the barrel 39.

A cylindrical tool holder 50 having a central bore 51 which extends coaxially with respect to the bore 44 is removably mounted in the body member 42 by a back head nut 53 and an adapter nut 54. The tool holder 50 supports a die 59 in alignment with the bore 51 and mounts a core tube 61 in axial alignment with die 59. The tool holder 50 is designed to deflect insulation material 18 from a direction flowing downwardly as viewed in FIG. 2 to a direction flowing to the right around the core tube and through the die 59 to form concentrically the covering 18 around the tinsel conductor 14 being advanced therethrough.

Figure 5:
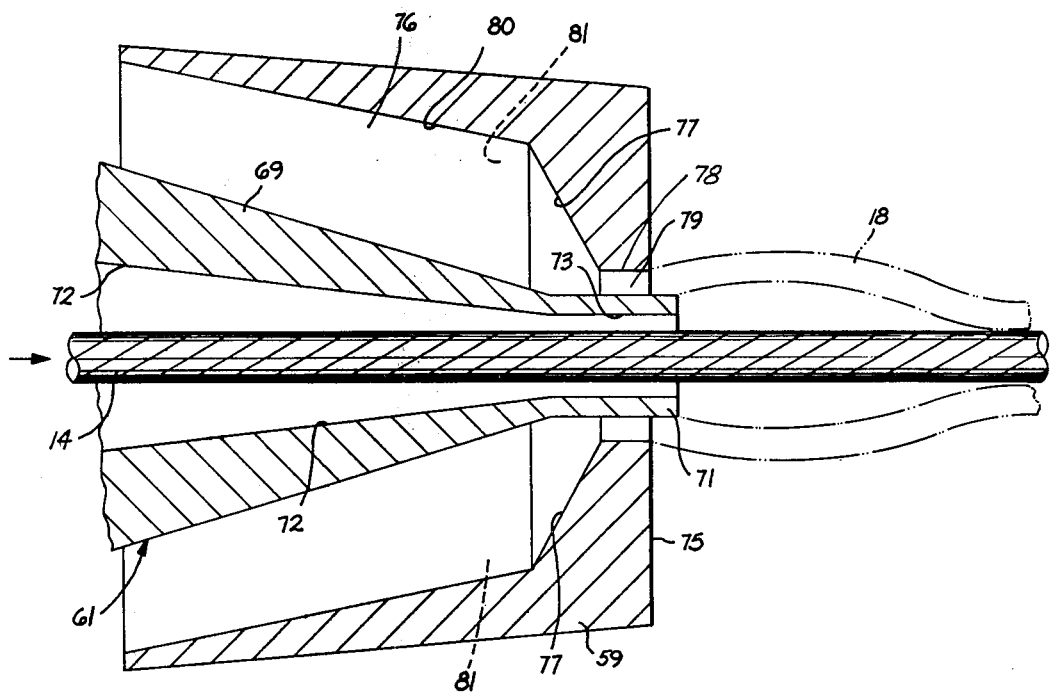
FIG. 5 is an enlarged detail view of a portion of the extruder die and core tube.

Referring to FIGS. 4 and 5, there is shown in detail the core tube 61. The core tube 61 includes a stepped cylindrical shape having an enlarged base portion 66, a second portion 67 having a reduced diameter but with outside walls thereof being parallel to the centerline of the core tube 61 and a third cylindrical section 68 which is connected to a tapered conical portion 69 finally culminating in a cylindrical portion 71. The core tube 61 is supported in the cavity 51 in the crosshead 41 supported therein such that the cylindrical portion 71 extends at least to a surface 75 of the crosshead to which the die 59 opens. The extruder 33 is designed to tube the insulation 18 over the conductor 14 as the conductor is advanced out of the extruder, to provide an air space between the insulation and the tinsel conductor.

As can best be seen in FIG. 4, the core tube 61 is constructed with a tapered bore 72 extending through the portions 66–68. The core 72 communicates with a cylindrical bore 73 which opens to the atmosphere.

The die 59 is constructed with a cavity 76 having a side or bearing wall 77 which has a frustoconical configuration and converges at some predetermined angle toward a land or throat 78 adjacent an opening 79 of the die 59. Typically, the angle formed between a line of generation of the frustoconical wall 77 and the centerline of the core tube 61 is on the order of magnitude of 15° to 30°. Surprisingly, with the use of the HYTREL ® insulation it was determined that an angle in the range of 60° to 90° and preferably 63° would be required in order to extrude successfully the HYTREL ® insulation 18 about the tinsel conductor 14.

The plastic material flows between a wall 80 of die cavity 76 and the frustoconical portion 69 of the core tube 61 which are spaced apart in a diverging direction (see FIG. 5). The plastic material flows at a high velocity to the end face of the core tube 61. Just to the left of the end walls 77—77, as viewed in FIG. 5, the cross-sectional area of the flow channel is greater than that prior thereto in the diverging portions of the die and the core tube 61. The pressure of the material on all sides of the portion of the core tube 61 is balanced. The tinsel conductor 14 is guided from the core tube 61 substantially in alignment with the cylindrical passage 79 of the die 59 so that the tinsel conductor is centered generally within the extrudate as the tinsel conductor is advanced out of the cylindrical bore 73 and the insulation cover material is extruded through the cylindrical passage in the die.

The configuration of the die cavity 76 having an unusually large approach angle of the bevelled bearing portion 77 causes an acceptable extrusion of the insulation notwithstanding the creation of an enlarged so called "dead space" 81. It should be apparent from FIG. 5 that the "dead space" 81 would appear to result in the extrudate being retained within the die for a longer period of time.

It would appear that because of the modification of a typical arrangement having a streamlined passageway converging toward the land 78, that the "dead space" 81 created toward the forward end of the die 59 on radially opposite sides of the core tube 61 would cause turbulent flow in the HYTREL ® material or act as a reservoir to avoid starving the extrudate flow. Generally it would seem as though a streamlined flow would be desirable in order to extrude a perfectly concentric material about the advancing tinsel conductor 14. Surprisingly, it has been found that the use of streamlined passages between the streamlined flow passages of the core tube 61 and the walls of the die cavity 76 does not produce an acceptable product. Rather it has been found that a die cavity 76 must be constructed having an approach angle of the wall 77 diverging from the land 78 to the innerwalls of the die cavity in the range of 120°–180° to extrude a generally concentric covering of the insulation 18 about the tinsel conductor 14.

It is desirable to maintain the molecular weight of the extrudate as the melt viscosity decreases. Since the molecular weight tends to decrease, it is important to attempt to extrude the thermoplastic through the die opening as rapidly as possible, in order to maintain the strength thereof. This further strengthens the aforementioned expectation that it would be desirable to minimize the holdup time of the extrudate within the extruder 33 die. On the other hand, if the die 59 is designed so that the approach angle or angle of attack, i.e. the included angle or angle embraced by the beveled side wall 77 of the die cavity 76 diverging from the throat 78 of the die adjacent the die opening 79, is substantially great, it would appear that the insulation composition may undergo degradation within the extruder crosshead 41.

One explanation for the unexpected success of the die construction described hereinabove relates to the affinity of HYTREL ® material to metal as compared to nylon for example. The HYTREL ® material may coat effectively the walls 77 and 80 of the die cavity with a laminar layer thereupon providing a measure of lubrication for HYTREL ® material advanced between the laminar layer and the external face of the core tube 61.

If the angle of attack were substantially less, e.g. the typical order of magnitude of 60°, the buildup of the layer on the walls of the die cavity could unduly restrict the flow path and lead to pulsations in the extrudate about the tinsel conductor 14. By using a larger angle of attack, there is sufficient size to the flow path after buildup of a laminar layer to obtain advantageously a uniform melt flow because of the flow of the copolymer material along a flow path bounded at least on one side thereof with a coating of the copolymer material. An additional advantage accrues to the process from what is believed to be a buildup of a laminar layer of copolymer along the walls 77 and 80 of the extruder die 59. This layer may act advantageously as a heat shield to insulate the copolymer in the flow path between the die and the core tube 61 from the heat of the crosshead thereupon facilitating extruding the copolymer at a temperature only slightly above the melting point thereof.

It will be seen from viewing FIG. 4 that the initial over-spacing of the HYTREL ® insulation from the tinsel conductor is accomplished by using the core tube 61 having the tapered cavity 72 at the upstream end thereof. In this way, a gaseous medium such as, for example, air at a pressure of 20 psi may be introduced through a flow rate meter 85 to introduce air at a volume flow rate of about 6 to 8 cubic feet per hour through a tube 86 into an opening 87 which communicates with a passageway 88 through a member 89 disposed concentrically with respect to the centerline of the crosshead 41 and into the tapered cavity between the walls of the cavity and the tinsel conductor 14 being advanced centrally therethrough. The air which is driven under pressure toward the downstream or exit end of the extruder crosshead 41 enters into the cylindrical portion of the core tube 61 between the tinsel conductor 14 and the walls of the core tube (see FIG. 5) and finally exits out from the extremity of the core tube which protrudes into the die opening 79.

The effect of the construction of the core tube 61 with respect to the die opening 79 in cooperation with the air pressure causes the HYTREL ® insulation to "balloon" or expand outwardly from the tinsel conductor as shown in FIGS. 4 and 5. Then, after the conductor 14 is advanced through a predetermined distance at a specific line speed sufficient for crystalline growth of the HYTREL ® insulation to occur, the insulation is drawn down about the tinsel conductor.

Crystalline polymers such as, for example, the HYTREL ® copolymer exhibit improved strength and flexibility when they have been treated in a manner to orient the polymer molecules parallel to one another and parallel to a major surface of the insulation 18. If provisions are made for molecular orientation, then the crystalline structure obtained during a period of crystalline growth will be oriented. Moreover, it has been found that molecular orientation enhances the rate of crystal growth.

The introduction of the air into the core tube 61 to expand the insulation cover 18 for a short distance downstream of the die opening 79 stresses the insulation. This causes the desired molecular orientation to occur within the copolymer material. It should be noted, however, that the use of air to expand and molecularly orient the copolymer is made possible by extruding the copolymer at a temperature slightly above, but as close as possible to, the melting point of the copolymer extrudate. If the copolymer extrudate was extruded at a temperature substantially higher than the melting point of the copolymer, crystalline growth does not occur any attempt to expand the extrudate would rupture the insulation 18.

The introduction of the air into the core tube 61 to expand the extrudate outwardly from the tinsel conductor 14 cools advantageously the extrudate below the melt temperature at the die opening 79. This causes the temperature of the polymer to decrease to within the aforementioned temperature range wherein crystalline growth occurs.

The crystalline insulation material has suitable strength to overcome any upstanding tinsel slivers and to compress them toward engagement with the configuration of the tinsel conductor. Moreover, as the insulation 18 assumes its generally final positions relative to the tinsel conductor with a wall, e.g. two mil air space therebetween, it has sufficient melt strength to stretch over any burrs or lumps of metal of considerable size which may occur on the tinsel without rupture. Advantageously, this results in a continuous reliably configured insulated tinsel conductor 11 which obviates the necessity for a rewind operation.

Subsequently, the insulated tinsel conductor 11 is advanced along a path through the treating facilities 34 (see FIG. 6) whereat the insulation is treated with a fluid, e.g. water, to cause the insulation to be cooled in a predetermined manner. The cooling facility 34 typically comprises a trough 90 in order to treat and anneal the insulation covering the tinsel conductor 14.

Referring now to FIG. 6, the treating facilities are shown in detail and may be observed to include a cold water section, designated generally by the numeral 91, and a hot water quench designated generally by the numeral 92.

The cold water section 91 includes facilities for engaging the insulation 18 with chilled water having a temperature on an order of magnitude of 50°-60° F. The section 91 includes a first V-shaped trough 93 mounted for movement on a rack 94 and spaced above the overall trough 90, supplied by a line 95 and having three spaced openings 96—96 therein for discharging three streams of chilled water into engagement with the tinsel conductor; the most upstream one of the streams being adjacent the exit port of the extruder. The upstream end of the water trough 93 is spaced a predetermined distance, "d", from the downstream end of the extruder crosshead plug 54. Changing "d" changes the outside diameter of the insulated conductor 11 and the length of the cone of drawdown, and affects the crystallization rate of the copolymer.

A second V-shaped trough 101 is spaced below the first trough 93 and downstream thereof a sufficient distance to permit the discharge streams from the first trough to engage the conductor unobstructed. The second trough 101 is supplied by a pipe 102 to cause a stream of water at a temperature of about 60° F. to be moved in a direction counter to that of the conductor being advanced therethrough.

Subsequently, the insulated conductor 11 is advanced through the section 92, wherein it is immersed in and treated with water having a temperature on the order of 150° F. The section 92 includes a conduit 103, spaced above the trough 90, which serves as a catch basin, and an inlet 104 connected to a supply (not shown).

The apparatus which embodies the principles of this invention optimizes the crystalline growth and insures that a substantial percentage of the total growth occurs prior to takeup in order to avoid the material acquiring a permanent set corresponding to the configuration of the takeup barrel 37. The insulation material is extruded at a melt temperature of about 432° F. in order to increase the melt strength thereof to facilitate the use of the air injection. The air injection is effective to cool the copolymer and promote crystalline growth as well as to orient the molecular structure of the copolymer by subjecting it to strain, which enhances the crystalline growth. If the extrudate were higher in temperature, expansion by air would rupture the insulation 18. Moreover, without the use of air injection, the extrudate at a temperature substantially in excess of the melting point of the copolymer would collapse on the tinsel with no air space; but possibly with bubble structures having formed and with non-uniform circular configurations. Then the cold water quench causes a rapid cooling which causes further crystallization to develop in the polymer material. Subsequently, in the section 92 the insulation is cooled more slowly to continue the growth of the oriented crystallization structure.

EXAMPLE 1

In a preferred embodiment for constructing an insulated tinsel conductor 11 having an outside diameter of 37 mils, an insulation wall thickness of 5.5 mils, and an air space between the insulation and the tinsel conductor of 2 mils, a tinsel conductor 14 was advanced at a line speed of 2,500 feet per minute through the extruder 33 having an L/D ratio of 24 to 1. In the extruder barrel, the feed zone temperature was about 400° F., the transition zone temperature was about 430° F., the metering zone temperature was about 440° F. and that of the head about 455° F. The temperature of the extrudate at the die opening 78 was about 432° F. Air flow into the core tube was at a rate of about 8 cubic feet per hour. The extruder amperage was about 15 amps while the screw speed was about 32 RPM. The die had an opening of 0.141 inch with an approach angle of 126°, while the core tube 61 had an outside diameter of 0.090 inch. The composition of the extrudate included about 3 pounds of color concentrate per 100 pounds of HYTREL ® 7246 polyester elastomer. The depth of the channel in the feed zone was about 0.425 inch, of the metering zone about 0.150 inch, and the transition zone had a taper of from 0.425 inch to 0.150 inch. The cooling system 34 was arranged so that the upstream-most one of the cold water streams 96—96 of water at about 60° F. was spaced 1.25 inches from the surface 75 of the die 59, with one inch between each of the three stream openings 96—96. The second trough 101 with water at 60° F. was spaced 4.5" from the downstream-most one of the streams 96—96. The entrance to the conduit 103 was spaced 4.5 feet from the die opening 79 and the water therein was at a temperature of about 155° F. Insulated tinsel conductors 11—11 constructed in accordance with this example exhibited a "blip frequency" of 45,000 feet, which is to say that tinsel silvers or burrs manifested in unacceptable protrusions from the conductor profile occurred at approximately every 45,000 feet.

EXAMPLE II

Same as Example I except that the feed zone temperature was 372° F., transition zone 444° F., metering zone 465° F. and head temperature of 450° F. The polymer was extruded at a temperature of 445° F. The air flow was 7 cubic feet per hour. The feed zone depth was 0.348 inch, metering depth 0.120 inch, and transition zone 0.348 inch to 0.120 inch. Extruder amperage was 12.0 amps, and screw speed was 37.0 RPM. The "blip frequency" was determined to be 30,000 feet.

EXAMPLE III

Same as Example I except that the feed zone temperature in the extruder was 410° F., transition zone temperature was 450° F., metering zone 450° F., head temperature 450° F. and the temperature of the polymer extrudate at the die opening was 450° F. No air was introduced into the core tube 61. The extruder amperage was 13 amps while the screw speed was 40 RPM. Only a hot water quench of 160° F. water was used. The insulated conductor 11 exhibited no space between the tinsel conductor 14 and the insulation cover, the wall being 7 mils thick. The "blip frequency" was determined to be 4,000 feet.

EXAMPLE IV

Same as Example I except that the feed zone temperature in the extruder was 410° F., the transition, metering and head temperatures each 450° F. and the polymer temperature at the die opening was 450° F. No air was introduced, the extruder amperage was 13 amps and the screw speed was 40 RPM. The insulated tinsel conductor 11 had no air space and had a 7 mil thick wall. The water bath included a cold water quench at a temperature of about 60° F. and a hot water anneal at a temperature of about 160° F. The "blip frequency" was determined to be 8,000 feet.

EXAMPLE V

Same as Example I except that the water treatment included only a 160° hot water anneal. The "blip frequency" was determined to be 37,000 feet.

It is to be understood that the above-described arrangements are simply illustrative of the invention. Other arrangements may be devised by those skilled in the art which will embody the principles of the invention and fall within the spirit and scope thereof.

What is claimed is:

1. An apparatus for covering a tinsel conductor, which includes a polymeric core having a plurality of tinsel ribbons wrapped spirally thereabout with a polyether polyester thermoplastic copolymer, which includes:

an extrusion head having a passage therethrough;
means for advancing a tinsel conductor along a path which is aligned with the passage through the extrusion head;

an extrusion die mounted at one end of the passage and having a cylindrical exit port which communicates with a die cavity that has a first portion having a generally frustoconical shape and a second portion having a generally frustoconical shape which converges toward the exit port with the converging wall portion thereof having a configuration which permits extrusion of the copolymer such that the temperature of the extrudate is slightly greater than the maximum temperature at which crystalline growth will occur in the copolymer;

a core tube positioned in the passage in axial alignment with the die for guiding a tinsel conductor toward the exit port of the die which includes a cylindrical portion having a cylindrical passage therethrough and a frustoconical portion having a frustoconical passage therethrough with the walls of the die cavity and the portion of the core tube having a frustoconical passage forming a gradually increasing flow passage with the first frustoconical portion of the die cavity for the thermoplastic material;

means for moving while working the thermoplastic copolymer along the flow passage and through the exit port of the die with the copolymer being spaced from the conductor by the cylindrical portion of the core tube which extends into the exit port;

means for expanding the extrudate outwardly from the conductor and for cooling the copolymer to orient molecularly the copolymer and to promote crystalline growth thereof;

means controlling the advancing means for causing the copolymer to be drawn down concentrically about the tinsel conductor to form an insulation cover which can move relative to the tinsel conductor with the molecularly oriented crystalline growth being effective to provide a uniformly insulated tinsel conductor notwithstanding irregularities in the tinsel conductor; and means for cooling further the insulation cover.

2. The apparatus of claim 1, wherein the means for cooling the cover is effective for a predetermined time after the expansion of the extrudate is begun.

3. The apparatus of claim 1, wherein the second frustoconical portion of the die cavity adjacent the exit port is such that twice the angle formed between a line of generation of the converging wall thereof and the axis of the die cavity is in the range of from about 120° to about 180°.

4. The apparatus of claim 3, wherein twice the said angle is equal to 126°.

5. The apparatus of claim 1, wherein the means for expanding the thermoplastic extrudate outwardly from the tinsel conductor includes means for introducing a gas into the core tube at the upstream end thereof and for causing the gas to flow through the core tube and to be controlled relative to the line speed at which the conductor is advanced to space apart the extrudate from the tinsel conductor a distance sufficient to stress orient the copolymer.

6. The apparatus of claim 5, wherein the downstream end of the core tube is aligned with the external surface of the die with which the exit port communicates.

7. The apparatus of claim 5, wherein the pressurized gas is at ambient temperature.

8. The apparatus of claim 1, wherein the means for cooling further the insulation cover is spaced a predetermined distance downstream of the exit port for treating the insulation of the insulated tinsel conductor to control the crystalline growth of the copolymer.

9. The apparatus of claim 8, wherein the cooling means includes means for causing chilled water in the range of 50° to 60° F. to engage the insulated tinsel conductor in spaced streams whereafter the insulated conductor is immersed in the chilled water.

10. The apparatus of claim 9, which includes means for causing the advancing tinsel conductor which has been engaged by water in the range of 50°-60° F. to be treated with water having a temperature in the range of 150° F.

* * * * *